United States Patent
Gurumoorthy et al.

(10) Patent No.: US 11,317,375 B2
(45) Date of Patent: Apr. 26, 2022

(54) COMMUNICATION COORDINATION AND COLLISION MITIGATION FOR MULTI-SUBSCRIBER IDENTITY MODULE DEVICES

(71) Applicant: Apple Inc., Cupertino, CA (US)

(72) Inventors: Sethuraman Gurumoorthy, San Jose, CA (US); Dawei Zhang, Saratoga, CA (US); Fangli Xu, Beijing (CN); Haijing Hu, Beijing (CN); Longda Xing, San Jose, CA (US); Murtaza Shikari, Mountain View, CA (US); Muthukumaran Dhanapal, Dublin, CA (US); Sree Ram Kodali, San Jose, CA (US); Srinivasan Nimmala, San Jose, CA (US); Srirang A. Lovlekar, Cupertino, CA (US); Vijay Venkataraman, San Jose, CA (US); Yaoqi Yan, Beijing (CN); Yuqin Chen, Shenzhen (CN); Zhiwei Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 16/892,031

(22) Filed: Jun. 3, 2020

(65) Prior Publication Data

US 2021/0014822 A1     Jan. 14, 2021

(30) Foreign Application Priority Data

Jul. 10, 2019    (CN) .......................... 201910620158.1

(51) Int. Cl.
*H04W 68/02*     (2009.01)
*H04W 72/12*     (2009.01)
*H04W 88/06*     (2009.01)

(52) U.S. Cl.
CPC ....... *H04W 68/02* (2013.01); *H04W 72/1215* (2013.01); *H04W 72/1247* (2013.01); *H04W 88/06* (2013.01)

(58) Field of Classification Search
CPC ............. H04W 68/02; H04W 72/1215; H04W 72/1247; H04W 88/00
See application file for complete search history.

(56) References Cited

U.S. PATENT DOCUMENTS

| | | |
|---|---|---|
| 9,088,339 B2 | 7/2015 | Christensen et al. |
| 10,034,320 B2 | 7/2018 | Shi et al. |

(Continued)

OTHER PUBLICATIONS

Qualcomm Incorporated; "Avoidance of paging collisions to minimize outage of services"; SA WG2 Meeting #122 S2-174243; San Jose Del Cabo, Mexico; Jun. 30, 2017; 15 Pages.

(Continued)

*Primary Examiner* — Joshua L Schwartz
(74) *Attorney, Agent, or Firm* — Kowert, Hood, Munyon, Rankin & Goetzel, P.C.

(57) ABSTRACT

This disclosure relates to systems, apparatuses, and methods for coordinating communication and avoiding and/or mitigating collisions for multi-subscriber identity module devices in a wireless communication system. A wireless device may coordinate communication associated with different subscriber identity modules and/or may mitigate collisions between communications associated with different subscriber identity modules. A network may provide information to improve coordination and/or mitigate collisions. A network may adjust paging schedules and/or provision of alert messages to improve coordination.

20 Claims, 6 Drawing Sheets

(56) References Cited

U.S. PATENT DOCUMENTS

| | | |
|---|---|---|
| 2015/0017982 A1 | 1/2015 | Klatt |
| 2015/0163827 A1 | 6/2015 | Ekici |
| 2016/0050686 A1* | 2/2016 | Krishnamoorthi .... H04W 28/04 455/418 |
| 2016/0095015 A1* | 3/2016 | Mohseni ............... H04L 1/1854 370/329 |
| 2017/0280473 A1 | 9/2017 | Krishnamoorthy et al. |

OTHER PUBLICATIONS

Intel Corporation; "Motivation for RAN level Multi-Sim Support"; 3GPP TSG RAN #84 RP-191347; Newport Beach, USA; May 25, 2019; 7 Pages.

Extended search report in Europe for Patent Application No. 20184524. 5-1215; dated Oct. 29, 2020; 21 Pages.

* cited by examiner

COMMUNICATION COORDINATION AND COLLISION MITIGATION FOR MULTI-SUBSCRIBER IDENTITY MODULE DEVICES

PRIORITY CLAIM

This application claims priority to Chinese patent application serial number 201910620158.1, entitled "Communication Coordination and Collision Mitigation for Multi-Subscriber Identity Module Devices," filed Jul. 10, 2019, which is hereby incorporated by reference in its entirety as though fully and completely set forth herein.

FIELD

The present application relates to wireless communications, and more particularly to systems, apparatuses, and methods for coordinating communication and avoiding and/or mitigating collisions for multi-subscriber identity module devices in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The increasing number of features and functionality introduced in wireless communication devices also creates a continuous need for improvement in both wireless communications and in wireless communication devices. In particular, it is important to ensure the accuracy of transmitted and received signals through user equipment devices (UEs), e.g., through wireless devices such as cellular phones, base stations and relay stations used in wireless cellular communications. For example, some UEs may include multiple subscriber identity modules (SIMs) which may be active concurrently. Under some circumstances, collisions may occur between transmissions to such UEs associated with different SIMs. Such collisions may negatively impact user experience and performance of the UE. In addition, increasing the functionality of a UE device can place a significant strain on the battery life of the UE device. For example, certain paging schedules for different SIMs may require increased power use. Thus, it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for coordinating communication and avoiding and/or mitigating collisions for multi-subscriber identity module (MUSIM) devices in a wireless communication system.

A MUSIM device may determine which SIMs are active and may determine networks associated with the active SIMs. The MUSIM device may detect potential collisions and/or other uncoordinated communications among the various SIMs. The MUSIM device may coordinate communication in order to avoid collisions and/or otherwise improve communication schedules to improve performance and/or reduce energy use. The MUSIM device may mitigate some collisions, e.g., by prioritizing communications according to various decision rules. The MUSIM device may communicate with one or more base stations according to the coordination and mitigation.

A network (e.g., base station and/or other network device) may provide information to a MUSIM device in order enable the MUSIM device to detect collisions and uncoordinated communication. Further, the network may provide information to the MUSIM device to enable the MUSIM device to mitigate collisions, e.g., by providing priority information and paging repetition patterns and information. Further, the network may adjust one or more paging schedules and/or approaches for delivering commercial mobile alert system messages based on information received from a MUSIM device in order to improve coordination of communications.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
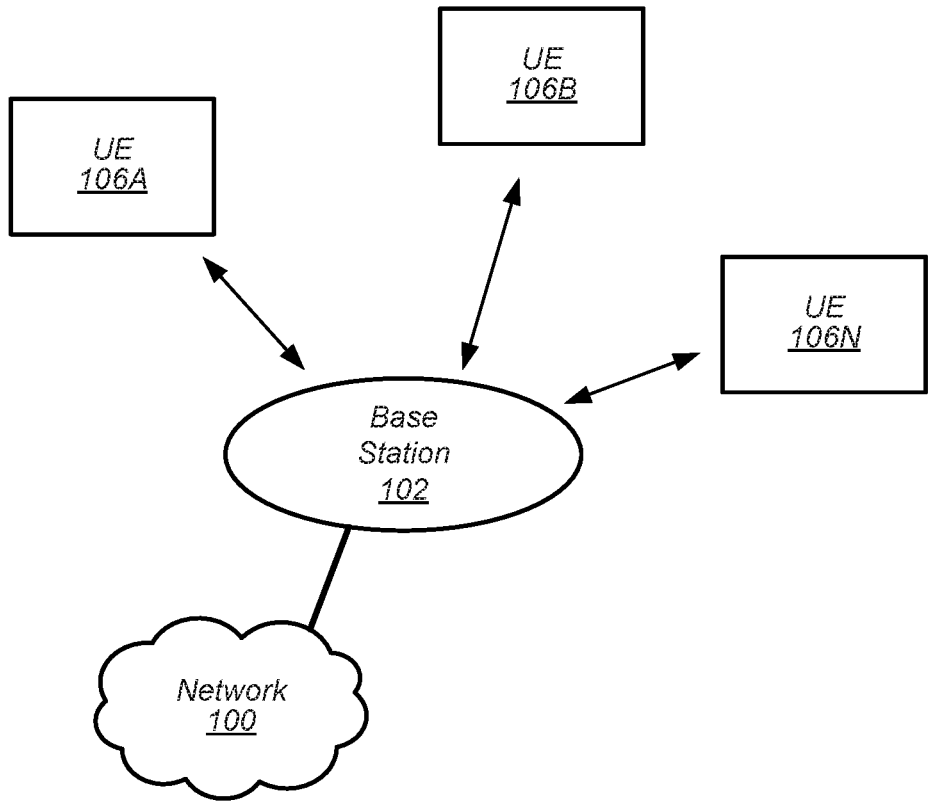
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment or User Equipment Device
RF: Radio Frequency
BS: Base Station
GSM: Global System for Mobile Communication
UMTS: Universal Mobile Telecommunication System
LTE: Long Term Evolution
NR: New Radio
RAN: Radio Access Network
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards
MUSIM: Multiple Subscriber Identity Module
SIM: Subscriber Identity Module Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
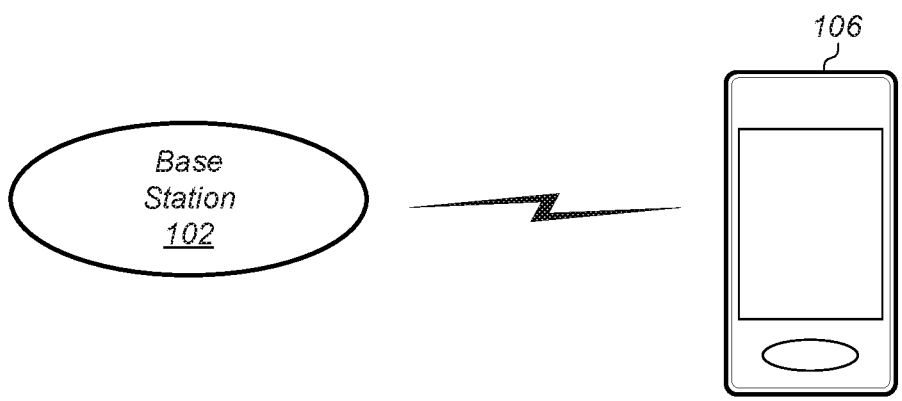
FIG. 2 illustrates an exemplary base station in communication with an exemplary wireless user equipment device (UE), according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

In some embodiments, the UE 106 may be configured to coordinate communications and avoid or mitigate collisions associated with different identities, at least according to the various methods as described herein.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuitry, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM or WCDMA), and separate radios for communicating using each of Wi-Fi and BLUETOOTH™. Other configurations are also possible.

In some embodiments, the UE 106 may include multiple subscriber identity modules (SIMs, sometimes referred to as SIM cards). In other words, the UE 106 may be a multi-SIM (MUSIM) device, such as a dual-SIM device. Any of the various SIMs may be physical SIMs (e.g., SIM cards) or embedded (e.g., virtual) SIMs. Any combination of physical and/or virtual SIMs may be included. Each SIM may provide various services (e.g., packet switched and/or circuit switched services) to the user. In some embodiments, UE 106 may share common receive (Rx) and/or transmit (Tx) chains for multiple SIMs (e.g., UE 106 may have a dual SIM dual standby architecture). Other architectures are possible. For example, UE 106 may be a dual SIM dual active architecture, may include separate Tx and/or Rx chains for the various SIMs, may include more than two SIMs, etc.

The different identities (e.g., different SIMs) may have different identifiers, e.g., different UE identities (UE IDs). For example, an international mobile subscriber identity (IMSI) may be an identity associated with a SIM (e.g., in a MUSIM device each SIM may have its own IMSI. The IMSI may be unique. Similarly, each SIM may have its own unique international mobile equipment identity (IMEI). Thus, the IMSI and/or IMEI may be examples of possible UE IDs, however other identifiers may be used as UE ID.

The different identities may have the same or different relationships to various public land mobile networks (PLMNs). For example, a first identity may have a first home PLMN, while a second identity may have a different home PLMN. In such cases, one identity may be camped on a home network (e.g., on a cell provided by BS 102) while another identity may be roaming (e.g., while also camped on the same cell provided by BS 102, or a different cell provided by the same or different BS 102). In other circumstances, multiple identities may be concurrently home (e.g., on the same or different cells of the same or different networks) or may be concurrently roaming (e.g., on the same or different cells of the same or different networks). As will be appreciated, numerous combinations are possible. For example, two SIM subscriptions on a MUSIM device may belong to the same equivalent/carrier (e.g. AT&T/AT&T or CMCC/CMCC). As another exemplary possibility, SIM-A may be roaming into SIM-B's network (SIM-A CMCC user roaming into AT&T and SIM-B is also AT&T).

Figure 3:
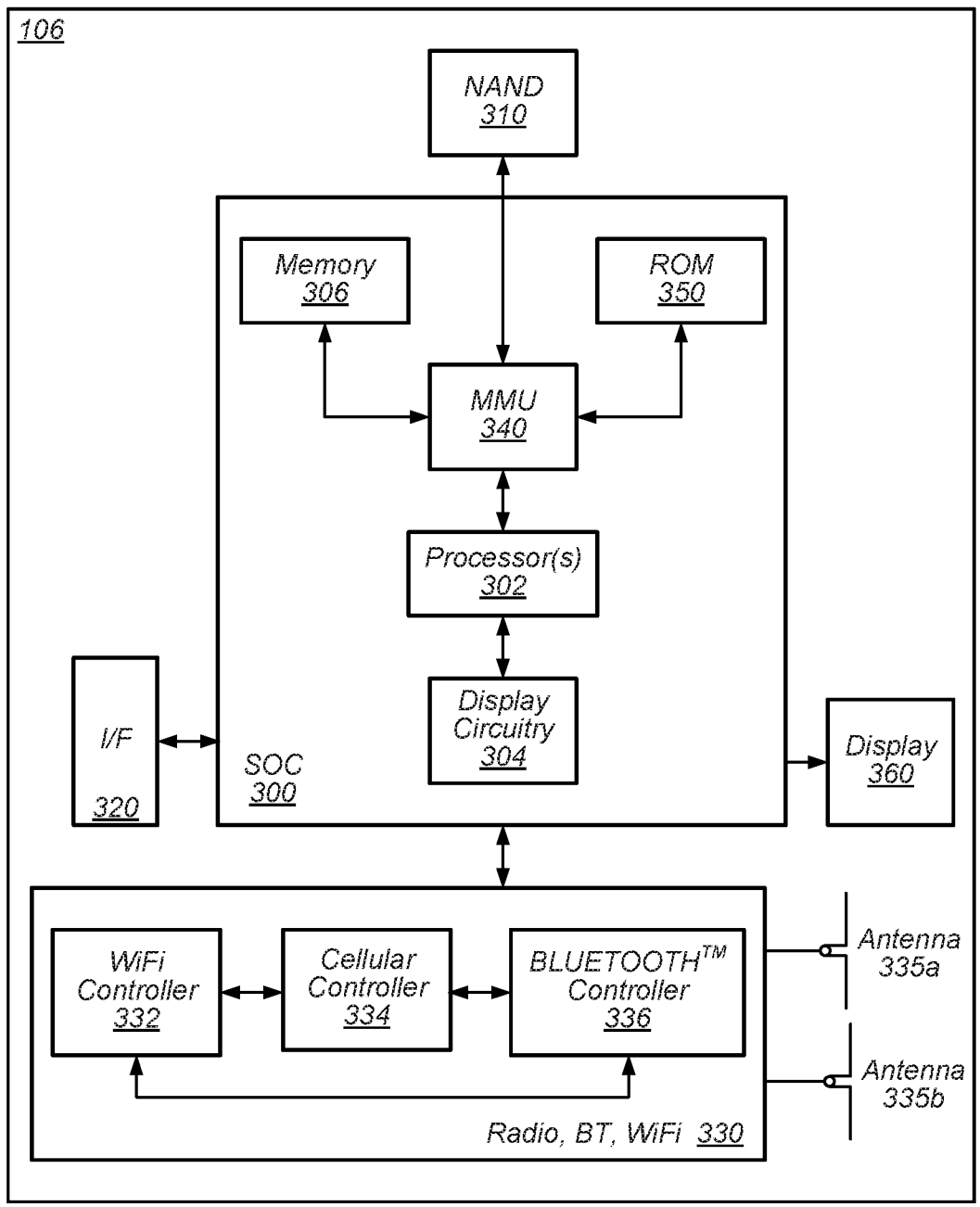
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods and embodiments. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Further-more, processor(s) 302 may be coupled to and/or may interoperate with other components as shown in FIG. 3, to perform communication according to various embodiments disclosed herein. For example, processor(s) 302 may cause UE 106 to avoid and/or mitigate collisions between transmissions associated with different SIMs. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 332, a cellular controller (e.g. NR controller) 334, and BLUETOOTH™ controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH™ controller 336 may communicate with cellular controller 334 over a cell-ISM link, etc. While three separate controllers are illustrated within radio 330, other embodiments have fewer or more similar controllers for various different RATs that may be implemented in UE device 106. Any or all of such controllers may be configured to implement any of the various methods and embodiments disclosed herein, e.g., to avoid and/or mitigate collisions between transmissions associated with different SIMs.

Figure 4:
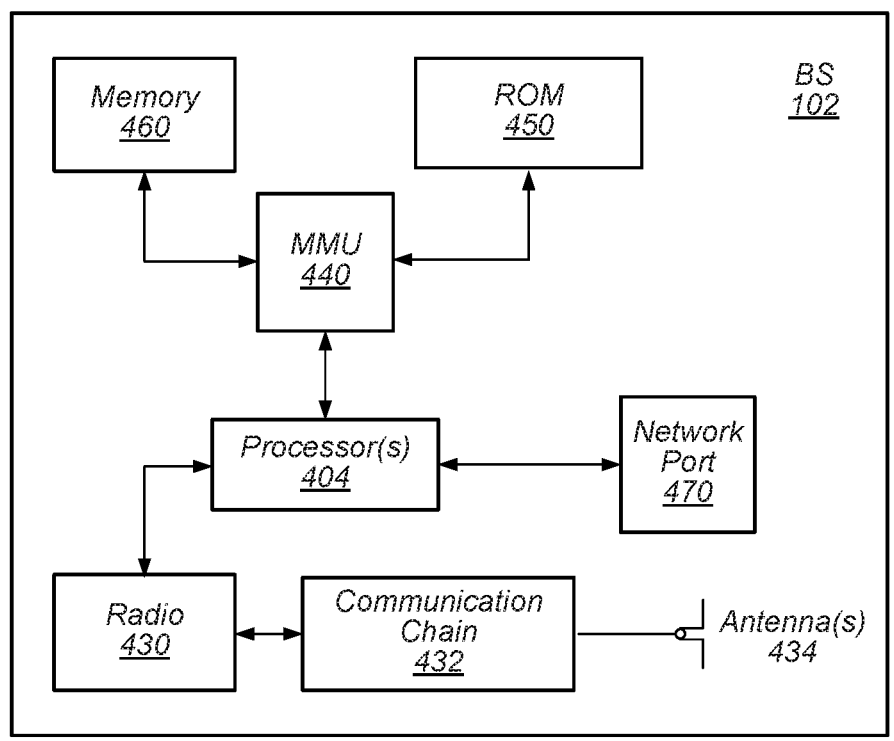
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Figure 5:
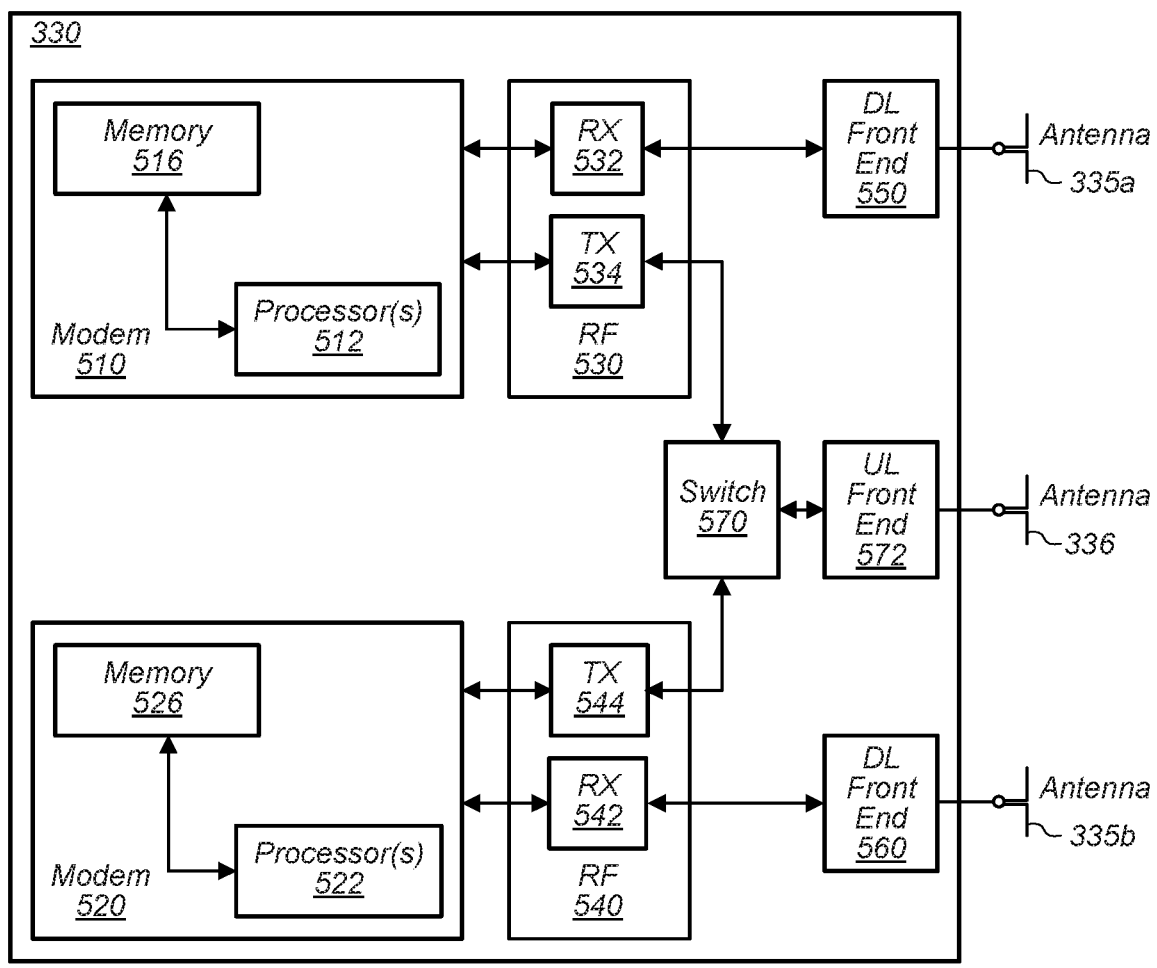
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains for multiple RATs (e.g., a first receive chain for LTE and a second receive chain for 5G NR). Such receive chains may include and/or be communicatively coupled (e.g., directly or indirectly) to dedicated processors and/or radios. For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
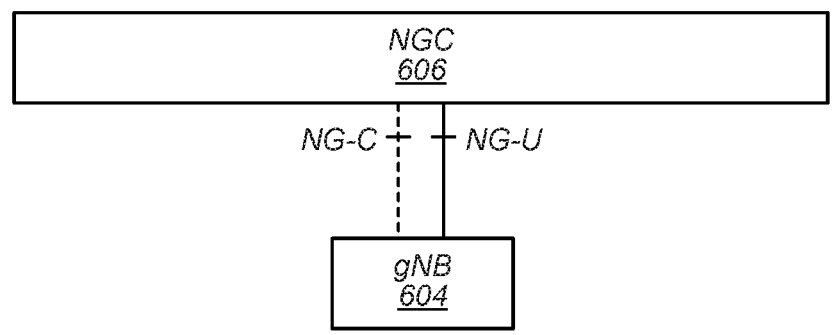
FIGS. 6 and 7 illustrate examples of a 5G NR base station (gNB), according to some embodiments.
Figure 7:
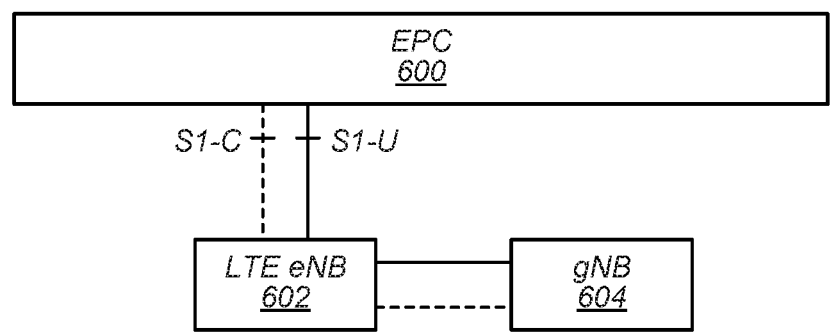

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
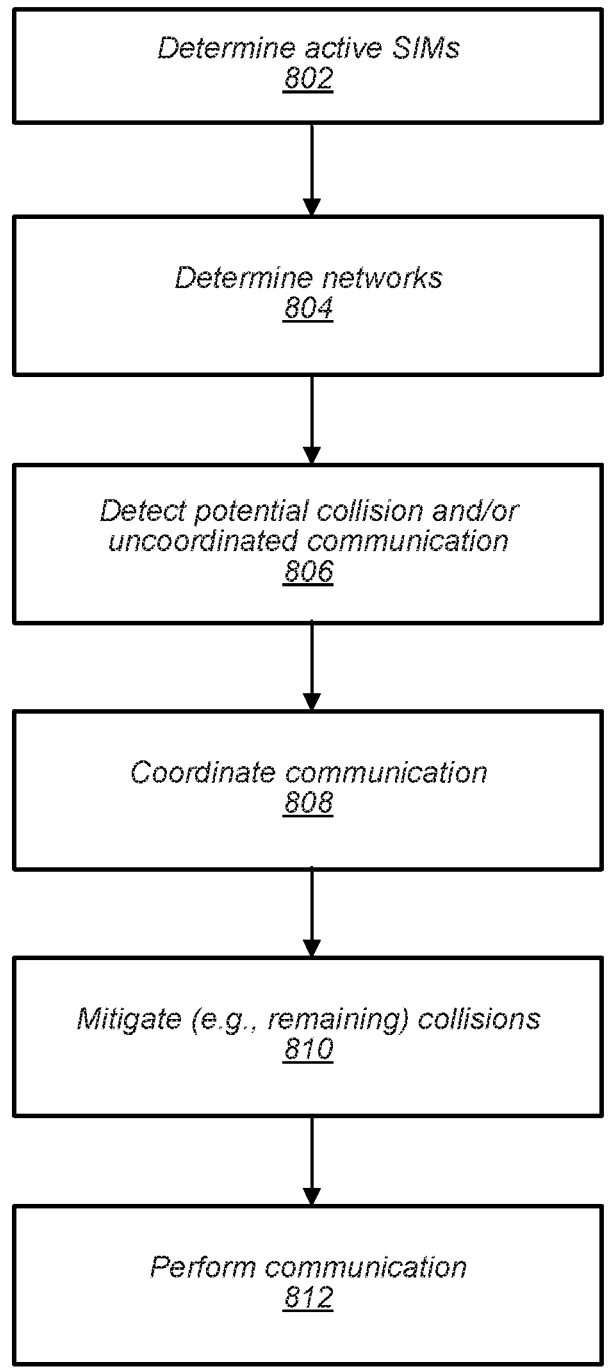
FIG. 8 illustrates an exemplary method for coordinating communication and mitigating collisions, according to some embodiments.

FIG. 8—Coordinating Communications and Mitigating Collisions for MUSIM Devices As described above, a UE 106 (e.g., or other wireless device) may contain multiple SIMs, e.g., UE 106 may be a MUSIM device. One or more networks associated with BS 102 (or multiple base stations 102) may not recognize that the different identities associated with the SIMs of UE 106 may belong to the same physical device (e.g., UE 106). In other words, one or more networks may treat the SIMs of UE 106 independently. Accordingly, communications to and from the various SIMs of UE 106 may not be coordinated by the network(s) and collisions and other problems associated with lack of coordination may occur. Such collisions may result in interference between the communications and missed messages such as missed pages (e.g., mobile terminated (MT) pages). A missed page may result in the UE being penalized by a network, among various possibilities. Additionally, such collisions may result in interruptions of a high priority activity (e.g., a voice call) of one SIM due to a page associated with a lower priority activity (e.g., a page indicating availability of downlink data) of another SIM. Such interruptions may degrade the user experience (e.g., may lower the throughput rate of a data transfer, etc.).

In some cases, collisions may occur between alert system messaging across multiple SIMs. Examples of such alert systems include, but are not limited to: commercial mobile alert system (CMAS), earthquake & tsunami warning system (ETWS), wireless public alerting service (WPAS), etc. Such collisions may lead to interference and the UE 106 may not successfully receive and decode such alert system messages. For example, upon receiving pages (e.g., to multiple SIMs) indicating the availability of alert system messages, the SIMs may both attempt to retrieve the alert system messages simultaneously. Such attempts at simultaneous retrieval may result in the SIMs competing for resources (e.g., RF circuitry, etc.) to perform the retrieval (e.g., the SIMs may each attempt to preempt the other SIMs actions).

Similarly, such lack of coordination of communication across the multiple SIMs may be inefficient. For example, paging occasions of the various identities may be separate. Accordingly, the UE 106 may wake up to monitor paging occasions of each identity. This increased amount of monitoring may significantly increase power consumption and reduce battery life.

Avoiding or mitigating such collisions and lack of coordination may be beneficial to the user experience, battery life, and performance of a UE 106. Additionally, mitigating the negative impact of collisions may offer similar benefits. FIG. 8 is a flow chart diagram illustrating methods of avoiding and/or mitigating coordination problems between communications associated with different SIMs, at least according to some embodiments. Aspects of the method of FIG. 8 may be implemented by a wireless device, e.g., in conjunction with one or more base station, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 8 are described in a manner relating to the use of communication techniques and/or features associated with NR and/or 3GPP specification documents, such description is not intended to be limiting to the disclosure, and aspects of the method of FIG. 8 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 8 may operate as follows.

A UE 106 may determine what SIMs (e.g., or more generally, identities) of the device are active (802), according to some embodiments. The UE 106 may determine various parameters of the SIMs, e.g., home and/or preferred networks (e.g., which networks are preferred for roaming based on any subscriptions of the SIM, etc.), which if any SIM is preferred for various functions (e.g., data, voice, etc.), UE IDs, etc. For example, the UE 106 may determine that one SIM is preferred for data transfers in a current location of the UE 106 based on the relative costs of data associated with subscriptions of the SIMS in that location.

The UE 106 may determine one or more networks (e.g., PLMNs) available to each SIM (e.g., or more generally, identity) of the device (804), according to some embodiments. For example, the UE 106 may determine whether or not a home network of a first SIM is available. Similarly, the UE 106 may determine whether each (e.g., or any) SIM is camped on any network, and whether or not a network that each respective SIM is camped on is a home network (e.g., or other preferred network or a roaming network the respective, etc.). The UE 106 may determine what networks are available and whether each available network is a home, preferred, or roaming network for each SIM. The UE may determine the availability of such networks prior to registration with any of the networks and/or after the UE has registered one or more SIMs with one or more networks.

In some embodiments, the UE 106 may determine one or more parameters associated with each network, e.g., based on system information transmitted by the BS 102. For example, the UE 106 may determine the paging configuration (e.g., the paging occasion(s) and related details) of the network(s). In some embodiments, the paging configuration transmitted by the BS 102 may allow the UE 106 to determine page repetition patterns of the network(s), e.g., the pattern of when and if a network will resend a page that the UE 106 does not acknowledge after a first transmission of the page. For example, the paging configuration may specify the number of times a page is repeated (e.g., pending a reply from the UE) and the duration between each repetition. Thus, the UE may be able to determine expected timing of one or more repetitions associated with a potentially missed page.

Further, the UE 106 may determine similar configuration information related to CMAS from the one or more networks, e.g., what time and frequency resources the BS 102 may use to transmit alert system messages and related pages to the UE 106.

The UE 106 may detect potential collisions and/or other problems associated with lack of coordination between communications associated with each SIM (806), according to some embodiments.

As a first detection example, the UE 106 may detect that the paging occasions (e.g., configured discontinuous reception (DRX) parameters) associated with two or more SIMs may be uncoordinated. In other words, the UE may determine that the paging occasions (e.g., DRX cycles) potentially cause the UE to monitor paging associated with the different SIMs on different time and/or frequency resources. Thus, due to uncoordinated paging cycles, the UE may have limited sleep (e.g., DRX off) time and therefore may use battery energy more rapidly than if the paging occasions of the different SIMs were coordinated.

As a second detection example, the UE 106 may detect collisions between paging occasions of different SIMs. For example, the UE 106 may determine that the paging occasions of different SIMs at the same time.

As a third detection example, the UE 106 may recognize possible collisions between alert system messages associated with different SIMs. In other words, the UE may recognize that the BS 102 (or multiple BS 102s) may send multiple (e.g., related, e.g., associated with the same underlying alert) alert system messages to the UE at the same time, and as a result that the UE 106 may not successfully receive such alert system messages.

As a fourth detection example, the UE 106 may detect a collision between an activity of first SIM and a page (or other activity) for a second SIM. The UE may determine various parameters of the activity and the page or other activity. For example, the UE may determine a priority level associated with the activity for the first SIM, e.g., a voice call may have a high priority level. Similarly, the UE may determine a priority level associated with the page. For example, the page may include a paging cause field (or other indicator of an activity with which the page is associated). A paging cause field may explicitly or implicitly indicate to a UE whether activity associated with the page is of a relatively high or low priority. A page indicating downlink data access (e.g., via such a cause field or other indicator) may be consider a low priority level, among various possibilities.

The UE 106 may (e.g., in cooperation with the network, e.g. BS 102) coordinate communications associated with different SIMs (808), according to some embodiments. In order to coordinate communications, the UE 106 may provide a coordination request and/or relevant information to one or more networks associated with one or more of the SIMs. Such a coordination request and/or information may indicate to one or more of the networks to adjust upcoming communications (e.g., a paging schedule, provision of alert system messages, etc.) to the UE 106 to avoid a potential collision between communications associated with the different SIMs. In other words, the coordination request may be based on the potential collision.

As a first coordination example, the UE 106 may inform a network that it is a MUSIM device and/or provide a list of UE IDs (e.g., UE ID 1 associated with a first SIM and UE ID 2 associated with a second SIM) on which it may receive pages. The UE 106 may indicate a preferred UE ID (e.g., UE ID 1) for receiving pages. In other words, the UE 106 may transmit a coordination request to the network to provide pages for UE ID 2 on paging occasions for UE ID 1. The UE 106 may provide this information to the network upon initial registration (of one or both SIMs) or at any later time or even as a response to a request from the NW to provide such information. For example, the UE 106 may include the information in a registration request transmitted to BS 102, which the BS 102 may relay to a core NW element. This first coordination example may be particularly useful in scenarios in which two or more SIMs of the UE are camped on the same network (e.g., in some cases of the first detection example, described above). Similarly, this first coordination example may be useful in the case of RAN sharing such that multiple identities of the UE may be camped on different networks provided by the same base station. Based on such an indication, the BS 102 (e.g., or other network device) may ensure that the paging occasions for the UE 106 may be calculated based on UE ID 1 (e.g., for both the first and second SIMs). In other words, when the BS 102 receives (from a network element) a page for the SIM associated with UE ID 2, it may transmit the page on time/frequency resources corresponding to a paging occasion associated with UE ID 1. For example, the BS 102 may include an identifier in the page indication identifying the page as a page for UE ID 2. Similarly, the BS 102 may transmit pages for UE ID 1 on resources associated with a paging occasion for UE ID 1, and may include an identifier indicating the page is for UE ID 1. Thus, the UE 106 may only monitor paging occasions (e.g., DRX on durations) associated with UE ID 1. Upon receiving a page for UE ID 1, the UE 106 may process it normally, e.g., using the first SIM. Upon receiving a page for UE ID 2 (e.g., on a paging occasion associated with UE ID 1), the UE 106 may internally forward the received page to the second SIM, e.g., or a processing element associated with the second SIM. The UE 106 may then proceed with normal page processing, e.g., using the second SIM. For example, upon receiving a page, the UE 106 may identify which SIM the page is associated with and may provide the page to a processing element or stack executing operations for the relevant SIM (e.g., UE ID 1 or UE ID 2). Thus, the UE 106 may avoid unnecessary tuneaways (e.g., interrupting an activity of the first SIM) or on durations for page monitoring for UE ID 2.

In some embodiments, a page to the SIM associated with UE ID 2 may be transmitted via a link/cell associated with the SIM associated with UE ID 1. However, the page may be transmitted in the paging occasion determined based on UE ID 2.

As a second coordination example, the UE 106 may transmit a coordination request to a network in order to alter a paging occasion of first SIM in order to coordinate with a paging occasion of a second SIM. This approach may be useful in scenarios where the various SIMs are camped on different networks or base stations. For example, this approach may be useful if the UE detects a potential collision between the paging occasions of the two SIMs (e.g., the second detection example). Further, this approach may be useful in scenarios where the UE detects that the paging occasions are staggered in such a way as to increase the UE's power consumption relative to a coordinated paging schedule (e.g., the first detection example). In such scenarios, the UE may request to alter one paging occasion to be (e.g., immediately) before or after the other paging occasion. Alternatively, the UE 106 may request to alter the paging occasions so that they occur at the same time but on frequencies that the UE 106 may simultaneously monitor. Thus, the UE may be able to sequentially monitor the two paging occasions (e.g., during a single DRX on period), and then power off some communication circuitry (e.g., for a DRX off period). As a first possibility, the UE 106 may request to the network to provide an offset to the pre-calculated paging occasion of the first SIM, e.g., to shift the paging occasion by an amount of time equal to the offset. The network may determine limits on such offsets and may indicate such limits as part of paging configuration information, in response to a query from UE 106, and/or in response to a request from UE 106 to alter is paging occasion (e.g., requesting an offset larger than the maximum offset limit). As a second possibility, the UE 106 may (e.g., additionally or alternatively) provide an indication to the network of the paging occasion of the second SIM. Thus, the UE may provide information to the network associated with the first SIM so that the network may determine and provide a collision free paging configuration (e.g., and coordinated DRX parameters) for the first SIM. Thus, the network may be aware of and minimize the potential for tuneaways. Such a request to alter a paging occasion (e.g., DRX, etc.) may be transmitted from the UE to the network using radio resource control (RRC) signaling, among various possibilities.

As a third coordination example, the UE 106 may transmit a coordination request including an indication to one or more networks regarding how or if that network should transmit alert system messages to the UE and/or may determine which SIM to use to retrieve alert system messages. In some embodiments, such an indication may allow the network(s) to implement a standardized approach to avoid alert system collisions to MUSIM devices. In some embodiments, the UE 106 may autonomously determine which SIM to use to retrieve a alert system messages based on the following possible decision rules. In such embodiments, the UE 106 may or may not indicate to the network(s) which SIM may be used to retrieve alert system messages. For example, the UE 106 may indicate to a first network that a second network has been selected to retrieve alert system messages and that the first network may not transmit alert system messages to the UE 106. Moreover, the UE 106 may transmit an indication to one or more (e.g., all connected)

networks indicating that the alert system message has been received (e.g., using the selected SIM).

As a first possibility, the UE may select a data preferred network or SIM to retrieve alert system messages. For example, if two SIMs are camped on their respective home networks, the UE 106 may determine to use a data preferred SIM to retrieve alert system messages, according to some embodiments. Thus, the UE 106 may indicate to one or both of the networks that the UE 106 will retrieve alert system messages of a network that is associated with a data preferred SIM. Thus, the other network may not provide alert system messages to the other SIM.

As a second possibility, the UE 106 may determine to use a home network (e.g., rather than a roaming network) to retrieve alert system messages. For example, if a first SIM is camped on a home network and the second SIM is roaming, the UE may determine to retrieve alert system messages via the home network, according to some embodiments. Thus, the UE 106 may indicate to one or both networks that the home network (and corresponding first SIM) may be used to retrieve alert system messages and/or that alert system messages to the second SIM (e.g., over the roaming network) may not be retrieved. Thus, the roaming network may not provide alerts to the second SIM.

As a third possibility, if a first SIM is in idle mode and the second SIM is in connected mode, the UE may determine to retrieve alert system messages via the connected SIM (e.g., regardless of whether the SIMS are connected to the same or different networks), according to some embodiments. Thus, the UE 106 may indicate to one or both networks that the connected SIM may be used to retrieve alert system messages and/or that alert system alerts to the idle SIM may not be retrieved. Thus, the network associated with the idle SIM may not provide alerts, e.g., while that SIM remains in idle mode.

As a fourth possibility, in the case of radio access network (RAN) sharing by multiple networks (e.g., PLMNs), multiple SIMs of a UE 106 may be camped on a same cell, but with different mobile country code (MCC) and/or mobile network code (MNC). In such cases, the UE 106 may select one of the SIMs based on the MCC and/or MNC to retrieve alert system messages. Thus, the UE 106 may indicate to one or both networks that the selected SIM may be used to retrieve alert system messages and/or that alert system messages to the unselected SIM may not be retrieved. Thus, the network associated with the unselected SIM may not provide alerts.

The UE 106 may mitigate collisions between communications with different SIMs (810), according to some embodiments. In other words, the UE 106 may determine which SIM to prioritize in the case of a collision (e.g., a collision that is not avoided based on the coordination described above with respect to 808) between communications on one SIM and communications on another SIM. For example, based on receiving a page for a first SIM, the UE 106 may determine that responding to the page would result in a collision and thus interfere with (e.g., require a tuneaway from) ongoing communication activity of a second SIM. The UE 106 may select whether to continue with the activity of the second SIM or to respond to the page for the first SIM based on paging repetition pattern, a one bit indicator of whether a page will be repeated, and/or a paging cause, among various possibilities as explained further below.

As a first mitigation example, the UE 106 may consider a paging repetition pattern (e.g., as indicated in paging configuration information) of a network, according to some embodiments. For example, as described above a network may provide (e.g., potentially in response to a request from UE 106) information about how a page is repeated if a first instance of the page is not acknowledged by the UE 106. For example, the paging repetition pattern may include a number of repetitions and the time interval(s) between the repetitions (e.g., a first repetition may occur 2 frames after the initial page, a second repetition will occur 3 frames later, etc., among various possibilities). Based on the paging repetition pattern, the UE 106 may determine whether to interrupt a communication of a first SIM (e.g., tuneaway from the first SIM) in order to respond to (e.g., retrieve and decode) a page from a second SIM. For example, the UE 106 may determine based on the paging repetition pattern of a network connected to a first SIM and an expected length of an ongoing communication (e.g., transmission and/or reception) of a second SIM, whether the ongoing communication activity may be complete prior to an expected repetition. The UE 106 may determine whether or not to interrupt the ongoing communication to tuneaway for a paging occasion of the first SIM based on the comparison. For example, the UE 106 may compare the expected length of the ongoing communication to an expected time until a particular page repetition. If the expected length is shorter than the expected time until the repetition, the UE 106 may determine to ignore the page occasion (e.g., and not tuneaway) in order to avoid interrupting the ongoing communication. Thus, determining not to respond to the page may allow the ongoing communication to complete prior to answering the page (e.g., at the particular page repetition or a page repetition prior to the particular page repetition). The UE 106 may select the particular page repetition as desired. For example, the UE 106 may select a particular page repetition so that a threshold number of further page repetitions are expected after the particular page repetition (e.g., to allow for the possibility that the UE 106 may miss the particular page repetition, e.g., due to factors related to or separate from the ongoing communication). For example, if the paging repetition pattern includes four expected repetitions, the UE may select the $2^{nd}$ or $3^{rd}$ repetition to allow for two or one, respectively, additional chances to receive the page of the paging occasion is skipped due to the ongoing communication. The UE 106 may receive and respond to a repetition of the page at any of the expected repetitions of the page (e.g., according to the page repetition pattern).

In some embodiments, a network (e.g., BS 102) may include other paging repetition information in a page or associated with a page, and the UE 106 may use this information to select whether to continue with the activity of the second SIM or to respond to the page for the first SIM. For example, a BS 102 may include one bit indicator in a page to indicate whether or not the page will be repeated (e.g., a page repetition indicator). The UE 106 may use the indicator (e.g., instead of or in addition to paging repetition information) to determine whether to respond to a page immediately or to wait for a repetition. The UE 106 may use such an indicator in combination with an expected length, as described above in the first mitigation example.

As a second mitigation example, a network (e.g., BS 102) may include a paging cause in a page, according to some embodiments. Thus, the UE 106 may consider the paging cause (e.g., as indicated in a page of a first SIM) to determine a priority level (e.g., to distinguish between high and low priority) of activity associated with the page and to determine whether or not to preempt activity of a second SIM based on the page. Thus, if the paging cause indicate a sufficiently high priority cause of the page (e.g., a priority level above a threshold), the UE 106 may interrupt ongoing activity of the second SIM in order to respond to the page. For example, the UE 106 may interrupt a data transfer of the second SIM in order to respond to a page indicating a voice call for the first SIM. Conversely, if the paging cause does not indicate a sufficiently high priority cause of the page, the UE 106 may determine not to interrupt the activity of the second SIM, e.g., and therefore to delay responding to the page of the first SIM. In other words, the UE 106 may consider the priority of the activity of the second SIM as well as (e.g., in comparison to) the priority associated with the paging cause of the first SIM. The UE 106 may consider additional factors such as paging repetition and/or expected duration as in the first mitigation example. Further, the UE 106 may consider factors related to the networks and/or preferences associated with each SIM. For example, the UE 106 may adjust the relative priority attributed to one or more SIM based on whether the network or SIM is preferred for data, voice, etc.

In some embodiments, the UE 106 may consider both a paging repetition pattern and a paging cause. In other words, aspects of the first and second mitigation examples may be combined. For example, the particular paging repetition may be selected based at least in part on a paging cause, e.g., a threshold number of page repetitions may be higher for a higher priority paging cause than for a lower priority paging cause. For example, if a paging cause indicates a voice call, the UE 106 may use a higher number of page repetitions than for data availability (e.g., to ensure that the voice call is connected promptly), while allowing some time for the ongoing communication activity to complete.

The UE 106 may communicate with BS 102 (or multiple base stations) according to the coordination and mitigation (812). This communication may include uplink and/or downlink transmissions using any or all SIMs of UE 106.

For example, the UE 106 and the BS 102 may coordinate according to any communication request transmitted by the UE 106 to the BS 102 (e.g., as discussed with respect to 808). In other words, the BS 102 and/or UE 106 may adjust one or more communication schedules to avoid any potential collisions identified (e.g., in 806).

Similarly, in the case that a potential collision is not avoided, the UE 106 may prioritize communications (e.g., as discussed with respect to 810).

In some embodiments, the UE 106 and/or BS 102 may adjust various communication parameters (e.g., paging occasions, prioritizations, etc.) as needed based on changes in conditions. For example, the UE 106 may move and connect to different networks, and may thus adjust decision rules regarding tuneaways, coordination between paging schedules, etc.

In the following further exemplary embodiments are provided.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
  determine a first network associated with a first subscriber identity module (SIM);
  determine a second network associated with a second SIM;
  determine information for a coordination request to avoid a collision between a first communication from the first network for the first SIM and a second communication from the second network for the second SIM, wherein the information includes an offset limit to a paging occasion of the first SIM indicated by the first network to the wireless device;
  transmit, to a base station associated with the first network, the coordination request to avoid the collision, wherein the coordination request includes a requested offset to the paging occasion of the first SIM, wherein the requested offset is less than the offset limit; and
  communicate, with the base station, according to the coordination request, wherein said communicating avoids the collision.

2. The apparatus of claim 1, wherein the coordination request includes a request to the first network to alter a paging occasion of the first SIM.

3. The apparatus of claim 2, wherein the first network and the second network are different.

4. The apparatus of claim 2, wherein the first network and the second network are different, wherein the coordination request includes an indication to the first network of a paging occasion of the second SIM.

5. The apparatus of claim 1, wherein the first network and the second network are the same, wherein the coordination request includes an indication to the first network to transmit pages for the first SIM on a paging occasion associated with the second SIM.

6. The apparatus of claim 1, wherein the first network and the second network are different, wherein the coordination request includes an indication regarding how or if the first network should transmit alert system messages to the wireless device.

7. The apparatus of claim 6, wherein the first network is a home network for the first SIM and the second network is a home network for the second SIM, wherein the second SIM is a data preferred SIM, wherein the indication indicates that the wireless device will retrieve alert system messages over the second network.

8. The apparatus of claim 6, wherein the second network is a home network for the second SIM and the first network is a roaming network for the first SIM, wherein the indication indicates that the wireless device will retrieve alert system messages over the second network.

9. The apparatus of claim 6, wherein the first SIM and the second SIM are both camped on a same cell with a different mobile country code (MCC) and/or a mobile network code (MNC), wherein the processor is further configured to cause the wireless device to select the second SIM based on the MCC and/or MNC, wherein the indication indicates that the wireless device will retrieve alert system messages over the second network.

10. A wireless device, comprising:
a radio; and
a processor operably coupled to the radio and configured to cause the wireless device to:
determine a first network associated with a first subscriber identity module (SIM);
determine a second network associated with a second SIM;
determine information for a coordination request to avoid a collision between a first communication from the first network for the first SIM and a second communication from the second network for the second SIM, wherein the information includes an offset limit to a paging occasion of the first SIM indicated by the first network to the wireless device;
transmit, to a base station associated with the first network, the coordination request to avoid the collision, wherein the coordination request includes a requested offset to the paging occasion of the first SIM, wherein the requested offset is less than the offset limit; and
communicate, with the base station, according to the coordination request, wherein said communicating avoids the collision.

11. The wireless device of claim 10, wherein the coordination request includes a request to the first network to alter a paging occasion of the first SIM.

12. The wireless device of claim 11, wherein the first network and the second network are different.

13. The wireless device of claim 11, wherein the first network and the second network are different, wherein the coordination request includes an indication to the first network of a paging occasion of the second SIM.

14. The wireless device of claim 10, wherein the first network and the second network are the same, wherein the coordination request includes an indication to the first network to transmit pages for the first SIM on a paging occasion associated with the second SIM.

15. The wireless device of claim 10, wherein the first network and the second network are different, wherein the coordination request includes an indication regarding how or if the first network should transmit alert system messages to the wireless device.

16. The wireless device of claim 15, wherein the first network is a home network for the first SIM and the second network is a home network for the second SIM, wherein the second SIM is a data preferred SIM, wherein the indication indicates that the wireless device will retrieve alert system messages over the second network.

17. The wireless device of claim 15, wherein the second network is a home network for the second SIM and the first network is a roaming network for the first SIM, wherein the indication indicates that the wireless device will retrieve alert system messages over the second network.

18. The wireless device of claim 15, wherein the first SIM and the second SIM are both camped on a same cell with a different mobile country code (MCC) and/or a mobile network code (MNC), wherein the processor is further configured to cause the wireless device to select the second SIM based on the MCC and/or MNC, wherein the indication indicates that the wireless device will retrieve alert system messages over the second network.

19. A method, comprising:
at a wireless device:
determining a first network associated with a first subscriber identity module (SIM);
determining a second network associated with a second SIM;
determining information for a coordination request to avoid a collision between a first communication from the first network for the first SIM and a second communication from the second network for the second SIM, wherein the information includes an offset limit to a paging occasion of the first SIM indicated by the first network to the wireless device;
transmitting, to a base station associated with the first network, the coordination request to avoid the collision, wherein the coordination request includes a requested offset to the paging occasion of the first SIM, wherein the requested offset is less than the offset limit; and
communicating, with the base station, according to the coordination request, wherein said communicating avoids the collision.

20. The method of claim 19, wherein the coordination request includes a request to the first network to alter a paging occasion of the first SIM.

\* \* \* \* \*